F. E. GOUGH.
PISTON AND PACKING FOR THE SAME.
APPLICATION FILED SEPT. 6, 1921.
1,425,641. Patented Aug. 15, 1922.
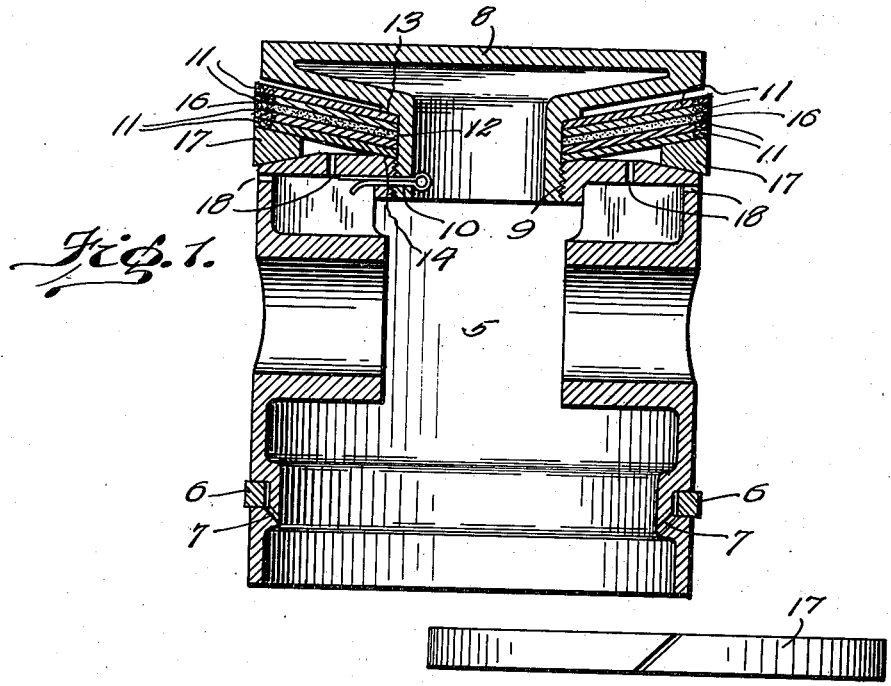
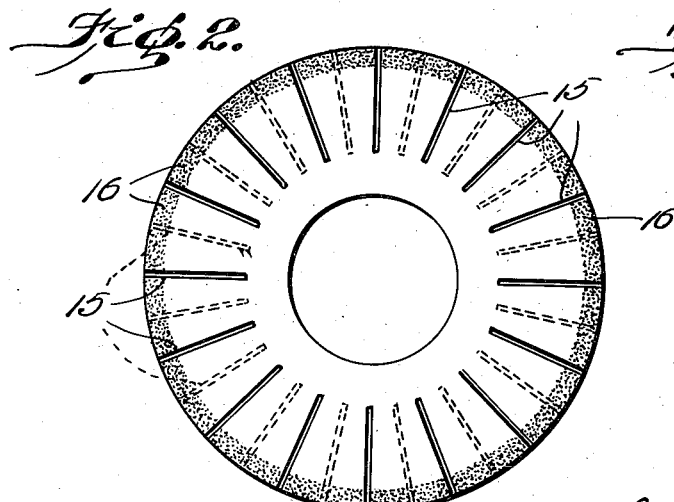
Frank Ellis Gough, Inventor
By Samuel Herrick,
Attorney

UNITED STATES PATENT OFFICE.

FRANK ELLIS GOUGH, OF OKLAHOMA, OKLAHOMA.

PISTON AND PACKING FOR THE SAME.

1,425,641.  Specification of Letters Patent.  Patented Aug. 15, 1922.

Application filed September 6, 1921. Serial No. 498,619.

*To all whom it may concern:*

Be it known that I, FRANK ELLIS GOUGH, a citizen of the United States, residing at Oklahoma, in the county of Oklahoma and State of Oklahoma, have invented certain new and useful Improvements in Pistons and Packing for the Same, of which the following is a specification.

This invention relates to pistons and packing for the same and it has for its object to provide an improved device of this nature constructed in such manner that an extremely effective seal between the piston and the wall of the cylinder will be provided, while at the same time a minimum of wear will take place.

Further objects and advantages of the invention will be set forth in the detailed description which follows.

In the accompanying drawing:

Fig. 1 is a vertical sectional view of a piston constructed in accordance with the invention;

Fig. 2 is a plan view of one of the packing plates hereinafter described; and

Fig. 3 is a fragmentary view of a portion of a split packing ring, hereinafter described.

Like numerals designate corresponding parts throughout the several figures of the drawing.

In the drawing 5 designates the main body of the piston the lower part or skirt of which is much like known structures and carries a conventional packing ring 6 which receives lubrication through the ports 7. A removable hollow head 8 is threaded at 9 for engagement with a correspondingly threaded portion of the piston 5. This head is held against reverse movement by a cotter pin 10. A plurality of metallic packing plates 11 and a composition gasket 12 are bound between shoulders 13 and 14 of the head 8 and piston 5, respectively, when the head is screwed in place. One of the plates 11 is shown in plan in Fig. 2 and by referring to that figure, it will be seen that these plates are radially slit, as indicated at 15, whereby they are rendered increasingly yielding and capable of conforming at all points to the contour of the cylinder wall. The outer edges of the plates 11 may be, and preferably are, composed of a non-abrasive wearing material of a nature to prevent excessive friction on the cylinder wall and to prevent scoring of said wall, this material being indicated at 16. The under side of the outer portion of the lowermost plate 11 bears upon the beveled upper face of a split packing ring 17. The lower face of this packing ring is likewise, preferably, beveled and has a bearing upon an inclined portion 18 at the upper outer edge of the body 5 of the piston. When an explosion takes place in the cylinder or a pressure is otherwise brought upon the piston to force the same downwardly into the cylinder, this pressure acts upon the plates 11 and gasket 12 and tends to move the outer portions of these parts downwardly and thus causes them to make tight engagement with the wall of the cylinder, it being understood that the slit portions of the several plates 11 are preferably placed in staggered relation to each other. The downward pressure of the plates against the packing ring 17 expands said ring and likewise causes the ring to snugly engage the wall of the cylinder. The result is that an extremely tight joint between the piston and the cylinder wall is effected and leakage of the gases past the piston is effectually prevented.

The walls of the cylinder are lubricated through ports 20 which are formed in the main body 5 of the piston. The packing ring 17 is lubricated through ports 18ª formed in the body portion 5 of the piston, while the interior of the head 10 is cooled by the oil splashed up into the piston.

It will be observed that the structure shown and described is of a nature to lessen friction on the cylinder walls to adapt itself to conform closely to the cylinder walls, irrespective of the contour of said walls; to give a high degree of compression; to automatically compensate for cylinder wear; to eliminate piston slap and by reason of the provision of the special wearing surface 16 to prevent scoring of the cylinder due to lack of lubrication. As the ring 17 wears the plates 11 and gasket 12 automatically lower and thus compensate for this wear. Thus maximum compression on the up stroke and the maximum sealing effect on the down stroke are maintained at all times.

The use of this type of piston will permit the use of under size pistons and consequently new pistons do not have to be so carefully fitted because the plates 11 effect all necessary sealing. A further advantage flowing from this construction is that dilution of the crank case lubricant is avoided and pumping of oil into the combustion chamber past the piston packing is largely eliminated.

More specifically the action of the device is as follows: On the up stroke of the piston there is a diminishing cubic capacity of the cylinder and therefore an increase in the compression, this compression acts on the plates 11 and through them upon the ring 17 which expands toward the cylinder walls and permits lowering of the outer edges of the plates 11. This automatic lowering of the plates insures a maximum of compression and therefore maximum power from the engine.

On the down stroke of the piston, up to a given point, the explosion pressure acts on the plates, thereby utilizing to the maximum the pressure generated by the explosion. Then, due to increasing cubic capacity of the combustion chamber, the pressure drops and the pressure on the plates decreases. This insures a long life for the cylinders and piston. While I have illustrated the ring 17 as being provided with beveled faces, I may, if desired, employ rings having faces of other shapes. Furthermore, the invention is not limited to the provision of a special anti-friction wearing surface on the plates 11, as these plates may be ordinary metallic plates throughout, if desired. In addition, the invention contemplates the provision of any suitable number of slots in the plates 11 as experience may show to be the best. The plates may vary in thickness and number depending upon the size of the cylinders.

The invention is not limited to the precise construction set forth but includes within its purview whatever changes fairly come within either the terms or the spirit of the appended claims.

Having described my invention what I claim is:

1. In combination a two-part piston, a flexible concavo-convex packing element clamped between the parts of said piston and a laterally expanding ring acting under the influence of said concavo-convex element.

2. The combination with a two part piston, of a plurality of flexible concavo-convex elements clamped between the parts of said piston, and a laterally expansible ring upon which the lowermost of said elements bears.

3. A piston of the character described comprising a body portion, a head of substantial T shape in cross-section threaded into said body portion and a plurality of elastic concavo-convex plates clamped between said head and body portions.

4. A structure as recited in claim 3 in combination with a split packing ring upon which the lowermost of said plates bears.

5. A structure as recited in claim 3 in combination with a split packing ring of wedge shape in cross-section upon which the lowermost of said packing plates bears.

6. In combination a two-part piston comprising a body portion and a head of substantial T shape in cross-section, a plurality of radially slotted concavo-convex plates clamped between the body portion and a laterally expansible ring upon which the outer portion of the lowermost of said plates bear.

7. A structure as recited in claim 6 in combination with a composition gasket between some of said plates.

8. A structure as recited in claim 7 in combination with means for conducting oil from the interior of the piston to the laterally expansible ring.

In testimony whereof he has affixed his signature.

FRANK ELLIS GOUGH.